April 10, 1928.
A. MOORHOUSE
MOTOR VEHICLE BRAKE
Filed Jan. 21, 1924
1,665,376
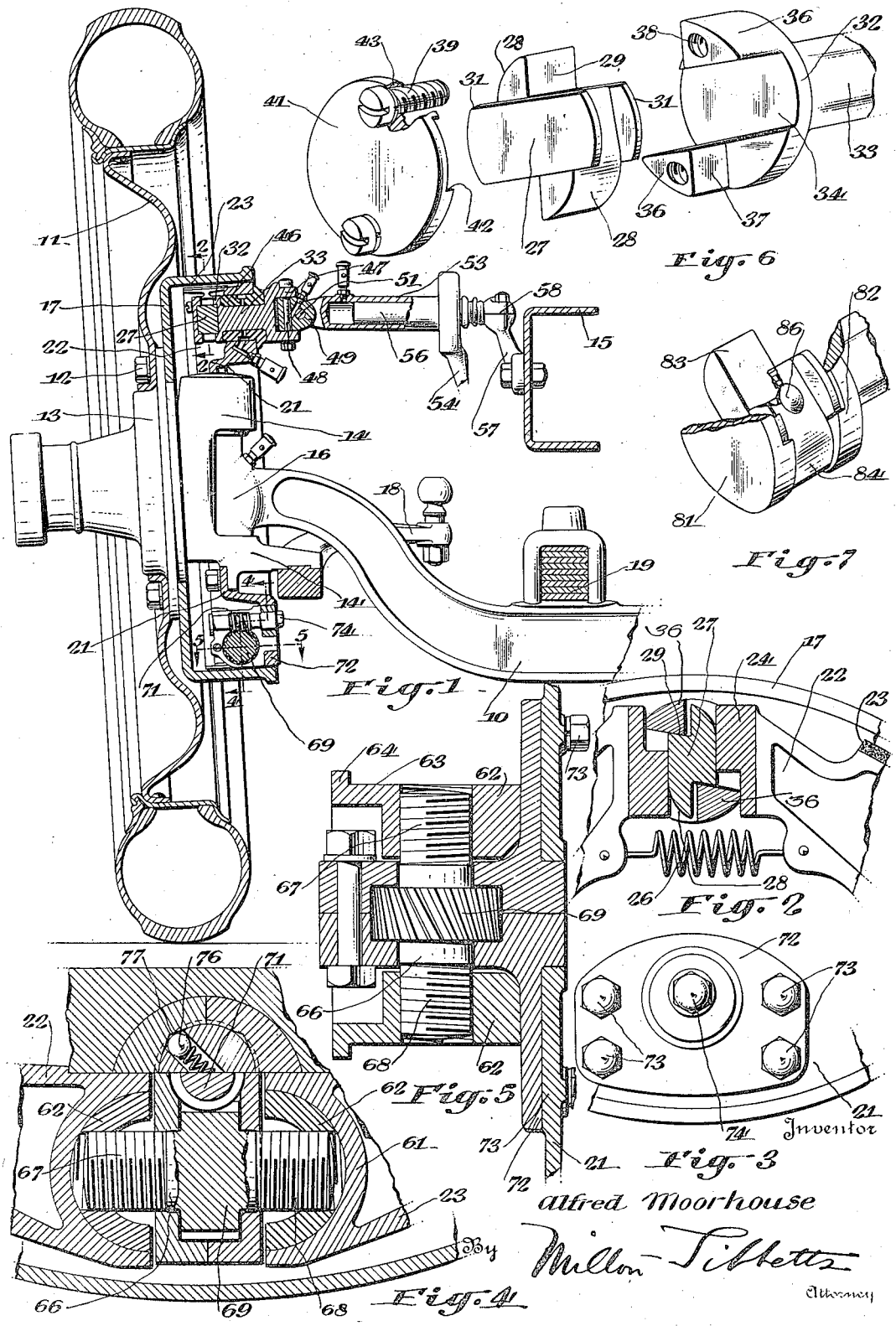
Inventor
Alfred Moorhouse
By Milton Tibbetts
Attorney

Patented Apr. 10, 1928.

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE BRAKE.

Application filed January 21, 1924. Serial No. 687,460.

This invention relates to motor vehicles, and more particularly to the brake mechanism thereof.

An object of the invention is to provide such mechanism, particularly for use upon the steering wheels of vehicles, in which both the actuating means and the adjusting means shall be simple and efficient.

Another object of the invention is to provide a brake mechanism of the expanding shoe type for an equalizing shoe actuator carried by and pivoting with the vehicle wheel.

Another object of the invention is to provide a brake actuating mechanism of the expanding shoe type in which the actuator is adapted to prevent lateral displacement of the shoes.

Another object of the invention is to provide such brake mechanism with suitable means for securing close and accurate adjustment of the shoes by a single adjustment.

Other objects of the invention will appear from the following description taken in connection with the drawing, which forms part of this specification, and in which:

Fig. 1 is a view, partially in elevation and partially in transverse section through the steering wheel of a motor vehicle equipped with this invention;

Fig. 2 is a view, partially in side elevation and partially in section on line 2—2 of Fig. 1, of the brake actuating cam, showing the engagement of the cam with the brake shoes;

Fig. 3 is a view showing the support for the brake adjustment device;

Fig. 4 is a section substantially on the line 4—4 of Fig. 1;

Fig. 5 is a section substantially on the line 5—5 of Fig. 1;

Fig. 6 is an exploded perspective view of the actuating cam mechanism which forms one feature of this invention, and Fig. 7 is a perspective view, partly broken away, of a modified form of cam.

Referring to the drawing, at 10 is shown the front axle of a motor vehicle and at 11 a steering wheel thereof. The wheel 11 is secured, as by the bolts 12, to a hub 13 which is journaled upon the usual steering shaft, the inner end of which being forked, as at 14, for pivotal mounting on an eye 16 in the end of the axle 10. A brake drum 17 is also secured to the hub 13. The members 14 and the member 16 form a steering knuckle, the parts of which are jointed by a suitable king pin (not known), and the member 14 is provided with a steering arm 18 adapted for actuation by the usual steering gear (not shown), to turn the member 14 about the king pin with respect to the member 16, and thus effect steering of the vehicle, in a manner well understood in the art to which this invention relates. The frame 15 and the body of the vehicle are supported from the axle 10 by springs 19 in the usual way.

Non-rotatably secured to the member 14 and adapted to pivot therewith in steering movements of the wheel is a brake supporting member or plate 21, adapted to support the brake mechanism. This brake mechanism comprises a pair of pivoted shoes, adapted to engage the drum 17, and actuating and adjusting means therefor.

The brake shoes 22 are pivotally secured at their lower ends to suitable adjusting mechanism, and are provided with friction lining 23 of any well known type adapted to contact the inner surface of the drum 17 in braking relation. The upper ends of the shoes 22 terminate in spaced abutments 24, between and against which the brake actuating means acts to expand the shoes 22 into contact with the drum 17. Suitable means are provided, such as the spring 26, to urge the shoes 22 toward each other in brake releasing position. They are urged apart by the action of a cam 27.

The cam 27 is formed with two lobes, comprising curved surfaces 28 cooperating with the shoe abutments 24, and flat surfaces 29 forming stop abutments for the cam. It is also provided with wing members 31 which project transversely to the curved surfaces 28 and embrace the shoe abutments 24 to prevent lateral movement of the shoes 22. These wing members also act as guides by which the cam 27 is slidably mounted in an actuating head member 32. The head member 32 is preferably integral with a rock shaft 33, and is provided with a slot 34, transverse to the axis of the shaft 33. Arranged on either side of the slot 34 are projecting spacing portions 36, in staggered relation, defining faces 37 which form abutments adapted for cooperation with the cam abutments 29. The spacing portions are also provided with axially disposed tapped holes 38, which cooperate with screws 39 to secure to the head 32 a cover member 41.

This cover member 41 comprises a flat plate provided with a slot 42 of the same dimensions as slot 34 and with holes 43 for passage of the screws 39. One of the wing members 31 cooperates with the slot 34, and the other wing member cooperates with the slot 42. It will therefore be seen that when the cover 41 is secured to the spacing members 36 with the cam 37 in position, this cam will have a limited sliding motion in the head 32 transversely to the axis of shaft 33. This sliding motion is utilized to equalize the pressure exerted by the cam on the brake shoes 22 as the head and shaft are rocked into brake applying position.

The rock shaft 33 is journaled in suitable bearings 46 mounted in the supporting member 21. The inner end of the rock shaft 33 is provided with a fork 47, forming one member of a universal joint, and pinned, as at 48, to an intermediate member 49 thereof. The member 49 is also pinned, as at 51, to an extension 52 on a tubular shaft 53, which is provided with an actuating arm 54, which arm is connected by any convenient linkage (not shown) to the operator's pedal. The tubular shaft 53 is arranged in telescopic cooperation with a shaft 56, secured to a bracket 57 on the frame 15 by any suitable joint 58. Thus it will be seen that the universal joint 49 and the telescopic shaft 56 permit the actuation of the brakes regardless of the angle to which the wheels 11 may be turned in steering, and regardless of the deflection of the vehicle springs 19.

The lower ends of the shoes 22 are pivotally mounted on the supporting plate 21 through suitable adjusting mechanism by means of which the position of the shoes with respect to the drum 17 can be varied to compensate for wear, etc. The end of each shoe is provided with a curved seating member 61, which is in cooperation with one of a pair of oppositely threaded nuts 62, each having a curved abutment surface at 63 making contact with the adjacent seating member 61, and each having a flange 64 adapted to prevent its rotation by engaging the side of the member 61. These nuts 62 are engaged by a turnbuckle screw or bolt member 66 having oppositely threaded portions 67 and 68, and carrying at its center portion an integrally formed worm wheel 69. The worm wheel 69 is adapted for cooperation with an adjusting worm 71, mounted in a suitable housing on the plate 72. This plate 72, which provides a base for the unit adjustment mechanism, is secured to the supporting member 21 in any convenient manner, as by the bolts 73. The worm 71 is provided at its outer end with a suitable bolt head or hexagon portion 74 which projects through the supporting member 21 and the plate 72 and is accessible for adjustment by means of any suitable wrench. The worm 71 is also provided with a spring pressed ball detent 76, cooperating with notches 77 formed in a worm housing, to hold the worm in adjusted position. It will now be seen that when it becomes necessary to adjust the brake shoes 22 closer to the brake drum 17, so as to compensate for wear, suitable motion is imparted to the worm 71 through the hexagon head 74 by means of a convenient wrench. By this single and simple adjustment the worm wheel 69 is rotated and the nuts 62 are moved outwardly on the threaded portions 67 and 68 of the bolt member 66, thus moving the lower or pivotal ends of the shoes 22 closer to the brake drum 17, and consequently increasing the range of shoe application throughout the entire length of the shoes 22.

In Fig. 7 is illustrated a different form of brake shoe actuator, wherein the cover portion 81 is integral with the head portion 82 and the spacing portions. In this form the respective lobes of the cam are formed as separate parts, 83 and 84, which are assembled from opposite sides of the head 82 and secured together while in place in any convenient manner, as by a rivet 86, or by welding.

It will be seen that by this invention a simple brake actuating mechanism is provided in which the thrust of the cam on the brake shoes is equalized, by virtue of its sliding motion, and in which the cam is at all times secured and protected within the head. The invention also provides an accurate means of adjusting the brake shoes in which close and accurate positioning of the shoes is possible, and in which the whole adjustment is effected at a single point.

It will be understood that various forms of the invention other than those described above may be used without departing from the spirit or scope of the invention.

What is claimed is:

1. In a motor vehicle brake mechanism having a brake drum and a pair of pivoted shoes adapted to be moved apart into contact with the drum, the combination of a slotted member having projecting portions with oppositely disposed faces forming abutments, an actuating shaft integral with the head, a cap member secured to the head having a slot parallel to and space from the slot in the head member, and a two lobed cam slidably mounted in the head member to actuate the shoes and adapted to be turned by the head member, said cam having spaced parallel wings adapted to cooperate with the slots and oppositely disposed shoulders engaging the abutments to limit the sliding travel of the cam in the head.

2. In a motor vehicle brake mechanism having a brake drum and a pair of pivoted shoes adapted to be moved apart into contact with the drum, the combination of a cam having oppositely disposed lobes adapted to engage the shoes respectively, a rotatable head member in which said cam is slidably mounted and having abutments adapted to limit said sliding motion, and a shaft rigidly secured to the head member to rock the cam into brake applying position.

3. In a motor vehicle brake mechanism having a brake drum and a pair of pivoted shoes adapted to be moved apart into contact with the drum, the combination of a slotted head member having axally disposed spaced portions on either side of the slot, a slotted cover member carried by the spaced portions, and a cam slidably mounted in said slots to operatively engage the ends of the brake shoes, said cam having oppositely disposed shoulders cooperating with the spaced portions to limit sliding motion of the cam, and having spaced wing-portions engaging the slots, the projecting ends of the wing portions being adapted to prevent lateral displacement of the ends of the brake shoes.

4. In a motor vehicle having an axle, a wheel pivotally mounted thereon, a brake drum secured to the wheel and a brake supporting member non-rotatably secured to the axle and adapted to pivot with the wheel, the combination of a slotted head member having a shaft journaled for oscillation on the supporting plate, a slotted cover member for the head member, a two lobed cam mounted to slide in said slots, a pair of brake shoes pivotally mounted on the supporting plate having end portions adapted for engagement with the lobes of the cam respectively, and means associated with the cam to prevent lateral movement of the shoes relatively to the drum.

5. The combination in a motor vehicle brake mechanism of a pair of pivoted shoes, a brake drum surrounding the shoes, and a slidable cam having oppositely disposed lobes adapted to engage the ends of the shoes, and means intermediate the lobes to limit the sliding motion of the cams.

6. The combination in a motor vehicle brake mechanism of a pair of pivoted shoes, a brake drum surrounding the shoes, and a cam mounted to engage the ends of the shoes, said cam having sliding guide members integral therewith and adapted to prevent lateral displacement of the ends of the shoes.

7. The combination in a brake mechanism for the pivoted steering wheels of motor vehicles, of a head, a shaft universally connected to the head and slidably connected to the vehicle, a cam having a limited sliding motion in the head, guide means integral with the cam, and brake shoes for the wheel engaging the cam between said guide means whereby rocking of the shaft exerts equal pressure on the shoes in any position of the pivoted steering wheels.

8. The combination in a brake mechanism for the pivoted steering wheels of motor vehicles, of a head, a shaft universally connected to the head and slidably connected to the vehicle, a brake drum on each of said wheels, a pair of pivoted shoes within each drum, a slotted head member, and a cam having lobe portions, said cam being slidably mounted in the slots in said head and adapted to engage the ends of the shoes, whereby an equal pressure of the shoes on the drum is produced by rocking of said shaft in any position of the wheel.

9. In combination in a brake mechanism, a drum, a pair of brake shoes, and means for pivotally supporting said shoes, said means including a pair of nuts having semi-circular bearing surfaces engaging said shoes, and a turnbuckle screw threaded to said nuts for adjusting said shoes relative to said drum.

In testimony whereof I affix my signature.

ALFRED MOORHOUSE.